United States Patent [19]
Horikawa

[11] Patent Number: 5,441,380
[45] Date of Patent: Aug. 15, 1995

[54] METHOD AND APPARATUS FOR CONVEYING TRAYS

[75] Inventor: Yoichi Horikawa, Toyama, Japan

[73] Assignee: Yoshida Kogyo K.K., Tokyo, Japan

[21] Appl. No.: 138,438

[22] Filed: Oct. 20, 1993

[30] Foreign Application Priority Data

Oct. 21, 1992 [JP] Japan .................. 4-208100

[51] Int. Cl.$^6$ ............................ B65G 59/06
[52] U.S. Cl. .................. 414/788.7; 414/794.2; 414/798.1
[58] Field of Search ............... 414/788.7, 794.2, 798.1

[56] References Cited

U.S. PATENT DOCUMENTS

| | | | |
|---|---|---|---|
| 4,687,403 | 8/1987 | Motoda | 414/788.7 |
| 5,190,434 | 3/1993 | Miura et al. | 414/794.2 |
| 5,348,411 | 9/1994 | Takemasa et al. | 414/788.7 |

FOREIGN PATENT DOCUMENTS

| | | |
|---|---|---|
| 2607793 | 6/1988 | France . |
| 60-171927 | 9/1985 | Japan . |
| 61-18623 | 1/1986 | Japan . |
| 2172867 | 10/1986 | United Kingdom . |

Primary Examiner—F. J. Bartuska
Assistant Examiner—Thomas J. Brahan
Attorney, Agent, or Firm—Hill, Steadman & Simpson

[57] ABSTRACT

In a tray conveying apparatus, a supply path and a discharge path are situated on the upper and lower sides, respectively, of the apparatus. The stocking, waiting, switching and collecting stations are arranged one under the other in order on the base-end side of the supply path. The waiting station is situated on the supply path, while the switching station is situated on the discharge path. The working station is situated on the front-end side of the supply path, and the shunting station is situated under the working station on the discharge path. Each of the stocking, waiting, switching, working and shunting stations is so constructed as to support and release the tray. The collecting station is vertically movable by the separating lifter, and the receiving plate under the shunting station is vertically movable by the transferring lifter.

12 Claims, 5 Drawing Sheets

METHOD AND APPARATUS FOR CONVEYING TRAYS

BACKGROUND OF THE INVENTION

1. Field of the Invention

This invention relates to a tray conveying method and apparatus in which for automatically attaching pull tabs to slide fastener sliders, a large number of trays each accommodating one of the pull tabs in row are previously stocked in stack, the loaded trays are supplied to a working station one at a time from the lowermost one of the stack, and the empty trays are collected.

2. Description of the Related Art

In conventional automatic assembling machines, it has been a common practice to use a bowl hopper feeder as a means for supplying pull tabs for slide fastener sliders. With this conventional feeder, the shape of the pull tabs which can be supplied from a row is limited to a plate-like shape having differences between upper and lower portions but identical between front and rear sides. If the form or design of the pull tabs is different between front and rear sides in view of fashionability or if the pull tabs have a unique form equipped with rubber, they cannot be supplied by the feeder. In the case where such unique pull tabs are to be supplied, it has been proposed to pre- place the pull tabs in a row on a tray and to convey the tray.

In a generally known tray conveying method, however, the lowermost loaded tray is separated from the waiting station where a large number of loaded trays are placed in a stack and is then supplied to the working station where parts are supplied to the automatic assembling machine by a robot or other means, and when the tray is emptied, the empty tray is discharged to the collecting station, opposite to the waiting station. This known method is exemplified by Japanese Patent Laid-Open Publication No. SHO 63-247221.

According to the conventional conveying method, the waiting, working and collecting stations are arranged basically in a row, and the row requires at least such a length that the trays to be conveyed can be placed in the individual stations. Assuming that this method is carried out by, for example, a rotary-table automatic assembling machine, various kinds of units are situated about a rotary table, each unit being located tangentially with respect to the rotary table to avoid any interference with adjacent units. This makes the distance between the working station and the placing station of the rotary table larger; as a result, when the parts are placed by a robot or other means, the extent to which the robot's arm is to be angularly moved will be greater so that it will take more time to supply the parts for assembling. Thus since such placing operation of the parts to the rotary table would take more time than placing operation of other parts, it is necessary to reduce the rate of rotation of the rotary table.

SUMMARY OF THE INVENTION

It is an object of this invention to provide a tray conveying method and apparatus for supplying parts using trays, the supplying position can be situated as near to the placing and working position as possible and in which an empty tray and a loaded tray can be exchanged with each other quickly.

According to a first aspect of the invention, there is provided a method of conveying trays along a supply path and a discharge path which is situated under the supply path in parallel through a waiting station situated at one end of the supply path, a working station situated at the other end of the supply path, a switching station situated in the discharge path at a position confronting the waiting station, a shunting station situated on the discharge path at a position confronting the working station, a stocking station situated above the waiting station, and a collecting station situated under the switching station, which method comprising the steps of: conveying a loaded tray, which accomodates a plurality of parts in rows, from the waiting station to the working station along the supply path; simultaneously with the conveying, returning an empty tray, which is supported in the shunting station, to the switching station along the discharge path; raising the empty tray, which has been returned to the switching station, up to the stocking station, supporting a large number of loaded trays in a stack on the raised empty tray in the stocking station, and then lowering the empty tray down to the collecting station; during the lowering step, supporting the stack of loaded trays except the lowermost loaded tray again in the stocking station; supporting the loaded tray, which is left on the empty tray, in the waiting station; during the last-named supporting step, lowering the emptied tray in the working station to the shunting station; and repeating the foregoing steps in order.

According to a second aspect of the invention, there is provided an apparatus for conveying trays, comprising: a stocking station in which a large number of loaded trays each accommodating a plurality of parts in rows are to be supported in stack and are to be released individually; a waiting station which is situated under said stocking station and in which the loaded tray separated from the stack of loaded trays is to be supported and released; a switching station which is situated under the waiting station and in which an empty tray is to be supported and released; a collecting station which is situated under the switching station and in which a large number of the empty trays are to be placed in a stack, the collecting station being adapted to be raised to and lowered from the stocking station via the switching station and the waiting station by a separating lifter; a working station which is situated at a forward end of a supply path extending from the waiting station and in which the tray is to be supported and released; a shunting station which is situated under the working station and in which the tray is to be supported and released; a receiving plate which is situated under the shunting station for supporting the tray and which is adapted to be raised to and from the working station by a transferring lifter; and a discharge path situated between the shunting station and the switching station. The above mentioned operation is repeated to convey the trays continuously.

Therefore, a large number of loaded trays are stocked in a stack in the stocking station, and when a loaded tray separated from the stack is supported in the waiting station situated under the stocking station, another loaded tray already supplied is existing in the working station. When the tray in the working station is emptied, the empty tray will be lowered to and supported in the shunting station, whereupon the loaded tray in the waiting station will be supplied to the working station and, at the same time, the empty tray in the shunting station will be returned to the switching station.

While the parts are loaded into an automatic assembling machine from the loaded tray in the working station, the collecting station is raised to support on the collecting station the empty tray in the switching station and also to support on the empty tray the loaded trays in a stack.

Subsequently, the collecting station with the empty and loaded trays supported thereon will be lowered, during which the stack of loaded trays except the lowermost one will be supported in the stocking station, and the separated lowermost loaded tray with the empty tray will be lowered beyond the stocking station. During the last-mentioned lowering, the separated loaded tray will be supported in the waiting station, and the collecting station with the empty tray supported thereon will be lowered to a predetermined position.

Thus, when the tray in the working station has been emptied, the foregoing steps will be repeated.

DETAILED DESCRIPTION

An embodiment of this invention will now be described with reference to the accompanying drawings. As shown in FIGS. 1, 2, 8 and 9, a supply path 3 is situated between a waiting station 1, in which a loaded tray T1 is to be supported, and a working station 2, which is situated at the front end of an horizontal extension of the waiting station 1 and in which likewise a loaded tray T1 is to be supported. A stocking station 4, in which a large number of loaded trays T1 are to be stocked in stack, is situated above the waiting station 1, and a switching station 5 is situated under the waiting station 1. Under the switching station 5, a collecting station 6 is situated. On the other hand, a shunting station 7 is situated under the working station 2, and a discharge path 8 situated between the shunting station 7 and the switching station 5. In the working station 2, parts in the loaded tray T1 are loaded to, for example, an automatic assembling machine by a hand H of a robot R. The shape of the individual trays is such that when they are placed in stack, a part of the bottom of an upper tray will be received in a lower next tray.

Figure 9:
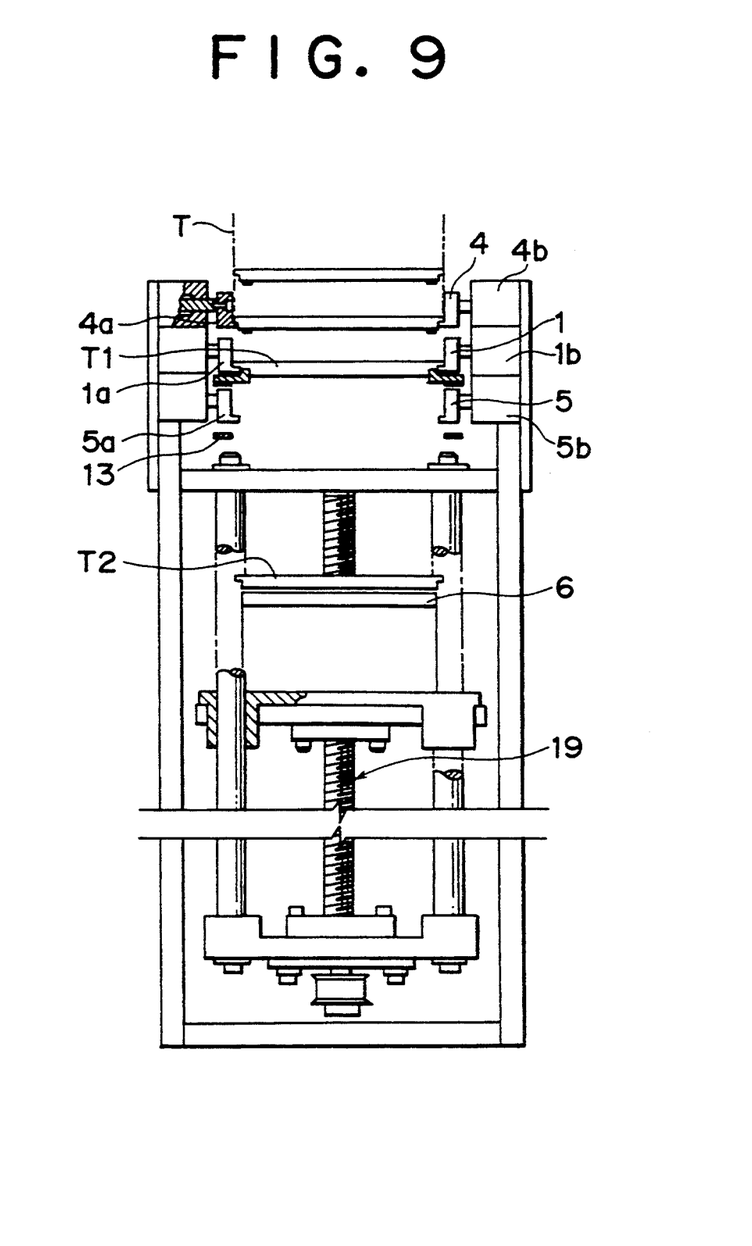
FIG. 9 is a front view of the tray conveying apparatus according to the invention.

The stocking, waiting and switching stations 4, 1, 5 situated on the base-end side of the supply path 3 are composed, as shown in FIG. 9, of a horizontal pair of support members 4a, 1a, 5a respectively, spaced apart normally by such a distance so as to support the tray, each support member having an L-shape cross section. Each of the pairs of support members 4a, 1a, 5a can be spread in a direction perpendicular to the supply path 3 by a respective pair of cylinders 4b, 1b, 5b to release the tray.

Figure 8:
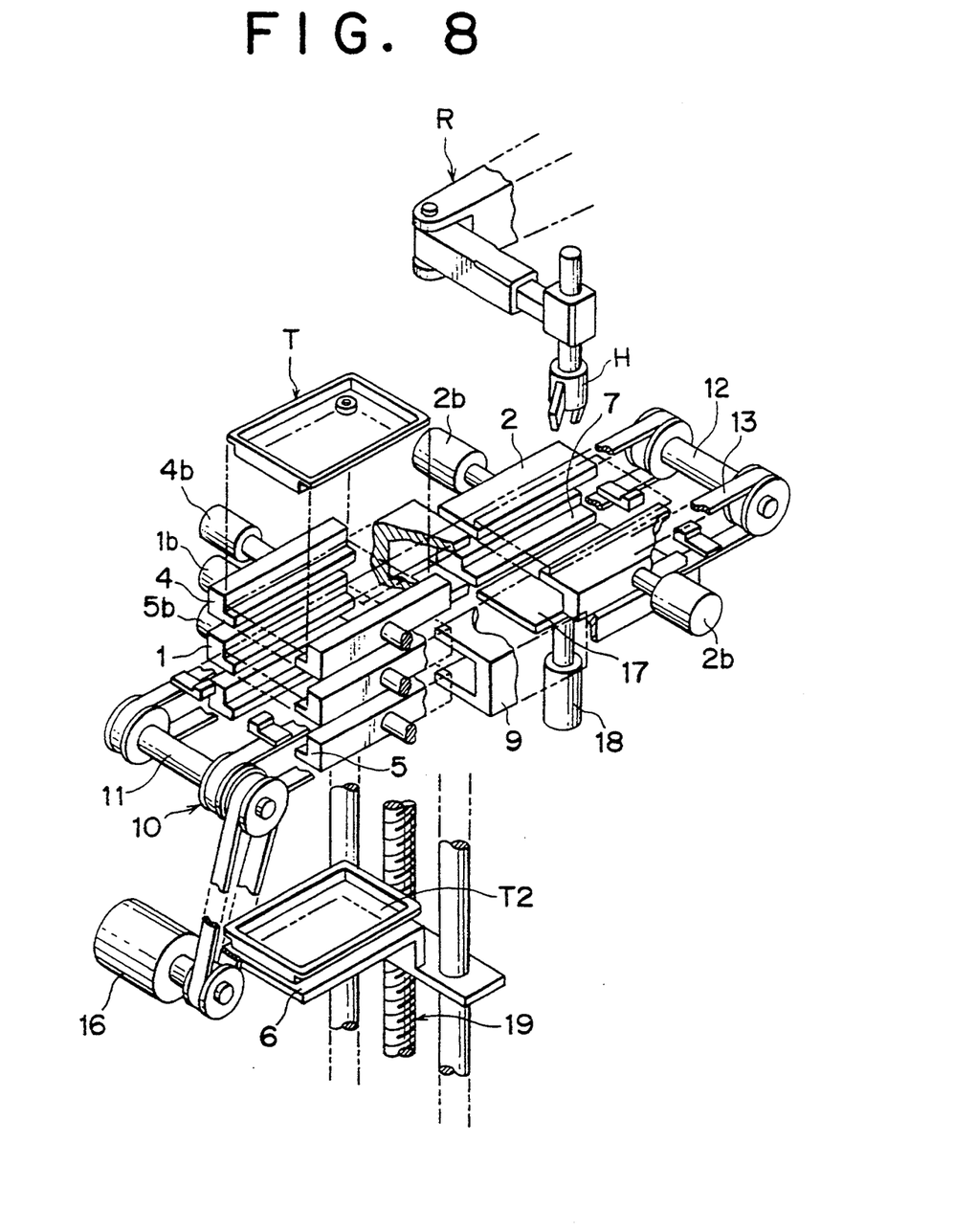
FIG. 8 is a schematic perspective view of a tray conveying apparatus according to this invention.

The working and shunting stations 2, 7 situated on the front-end side of the supply path 3 are composed, as shown in FIG. 8, of a horizontal pair of support members each having a generally C-shape cross section, opening to each other. The upper horizontal portions 2a of the support member pair constitute the working station 2, while the lower horizontal portions 7a of the same support member pair constitute the shunting station 7. The upper horizontal portions 2a are spaced apart normally by such a distance as to support the tray and can be spread horizontally in the longitudinal direction of the supply path 3 by a respective pair of cylinders 2b to release the tray.

Figure 1:
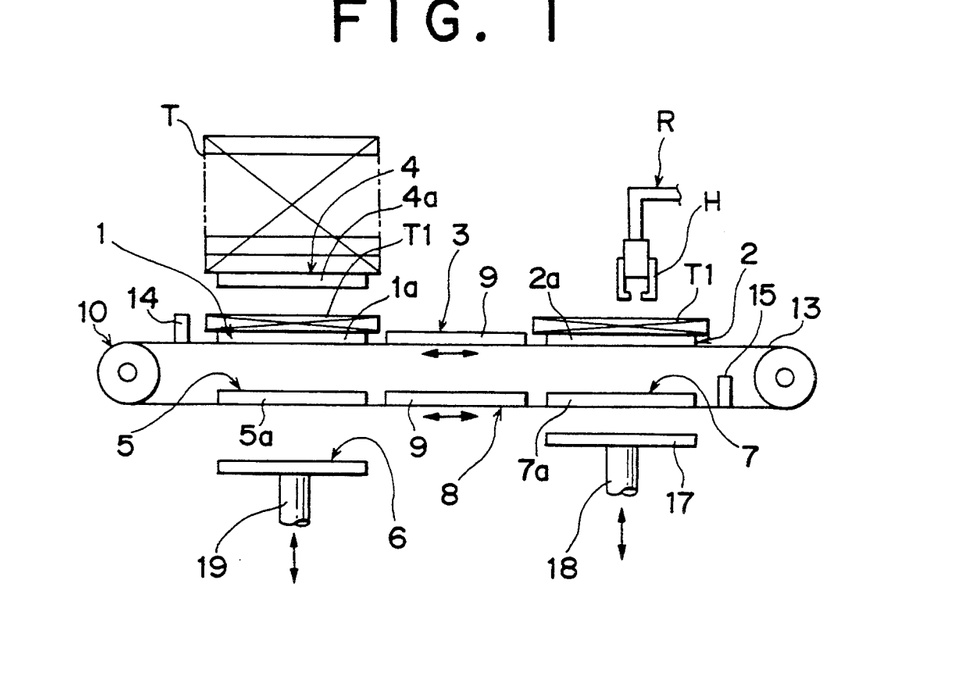
FIG. 1 is a schematic side view showing an apparatus for carrying out a tray conveying method according to this invention.

The supply and discharge paths 3, 8 situated between the waiting station 1 and the working station 2 is composed, as shown in FIGS. 1 and 8, of a horizontal pair of fixed guides 9 each having a generally C-shape cross section, opening to each other. The upper horizontal portions of the fixed guide pair 9 is arranged in horizontal alignment with the support members 1a of the waiting station 1 and the upper horizontal portions 2a of the working station 2 to constitute the supply path 3. On the other hand, the lower horizontal portions of the fixed guide pair 9 is arranged in horizontal alignment with portions 7a of the shunting station 7 and the support members 5a of the switching station 5 to constitute the discharge path 8.

The tray is conveyed onto the supply path 3 and the discharge path 8 by a conveyer 10. The conveyer 10 includes, as shown in FIG. 8, a horizontal driven shaft 11 situated at one end of a tray conveying path, a horizontal follower shaft 12 situated at the other end of the tray conveying path, and a pair of endless belts 13, 13 are wound between the driven and follower shafts 11, 12 via pulleys. The upper portion of the individual belt passes under the support member 1a of the waiting station, the upper horizontal portion of the fixed guide 9 and the upper horizontal portion of the working station 2, while the lower portion of the individual belt passes under the lower horizontal portion 7a of the shunting station 7, the lower horizontal portion of the fixed guide 9, the support member 5a of the switching station 5. On the upper and lower sides of each endless belt 13, two pairs of pushers 14, 15 are attached so that each pair of pushers will come into engagement with the tray to transmit the conveying force to the tray. The driven shaft 11 is connected with a motor 16.

As the motor 16 is energized, a loaded tray T1 supported in the waiting station 1 is conveyed to the working station 2 via the upper horizontal portions of the fixed guides 9 and, at the same time, an empty tray T2 supported in the shunting station 7 is returned to the switching station 5 via the lower horizontal portions of the fixed guides 9.

In order to convey the emptied tray in the working station 2 to the shunting station 7, as shown in FIGS. 1 and 8, a receiving plate 17 is situated under the shunting station 7 and is vertically movable by a transferring lifter 18, such as a cylinder. The receiving plate 17 has such a width that it can pass through the space between the upper horizontal portions 2a of the working station 2 and between the lower horizontal portions 7a of the shunting station 7 while they are supporting the tray.

Therefore, in transferring the empty tray T2 from the working station 2 to the shunting station 7, if the receiving plate 17 is raised, it will pass the shunting station 7 as nothing is supported in the shunting station 7. The empty tray 2 in the working station 2 is then placed on the receiving plate 17. After the upper horizontal portions 2a of the working station 2 are spread apart by the cylinders 2a (at the same time, the lower horizontal portions 7a of the shunting station 7 are spread apart), the receiving plate 17 is lowered so that the empty tray T2 on the receiving plate 17 will be horizontally aligned with the lower horizontal portions 7a of the shunting station 7 and, at the same time, the lower horizontal portions 7a are returned to the original position (at the same time, the upper horizontal portions 2a are returned to the original position). As a result, the empty tray T2 will be supported on the lower horizontal portions 7a, and the receiving plate 17 will be lowered until it reaches a predetermined position.

At the base-end side of the supply path 3, in order to separate the lowermost loaded tray T1 from a stack of loaded trays T on the stocking station 4 and to transfer the separated loaded tray T1 to the waiting station 1, the collecting station 6 can be raised to and lowered from the waiting station 4 by a separating lifter 19 as shown in FIGS. 1 and 8. The collecting station 6 is in the form of a plate to be moved vertically by the separating lifter 19 and having such a size that it can pass through the space of each of the waiting and stocking stations 1, 4 while the tray is supported therein.

The above-mentioned separating, as shown in FIGS. 4 through 7, takes place after the empty tray T2 has been returned to the switching station 5. Firstly as the separating lifter 19 is driven, the plate of the collecting station 6 is raised to receive on it the empty tray T2 supported in the switching station 5. With continued raising of the collecting station 6, it passes the waiting station 1, where nothing is supported, until it reaches the stocking station 4 to support the loaded trays T, which are stocked in stack in the stocking station 4, on the empty tray T2. During the raising of the plate, each of the switching, waiting and stocking stations 5, 1, 4 will be spread by the respective cylinders. Then the plate is lowered and, on its downward way, the second lowermost loaded tray T1 of the stack of loaded trays T is horizontally aligned with the stocking station 4, and at the same time, the stocking station 4 is returned to the original position to support the stack of loaded trays T again. At that time, on the plate, a loaded tray T1 is placed on the empty tray T2, and the plate with the loaded tray T1 on the empty tray T2 is then lowered. On the downward way of the plate, the loaded tray T1 is horizontally aligned with the waiting station 1, and at the same time, the spread waiting station 1 is closed to support the loaded tray T1. At that time, only the empty tray T2 is placed on the plate. The plate is lowered beyond the switching station 5 until it reaches a predetermined position.

Figure 3:
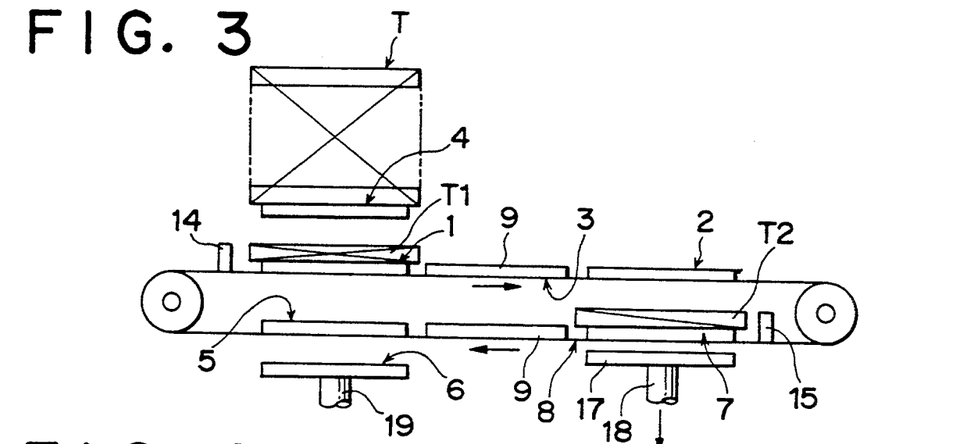
FIG. 3 is a schematic side view showing the apparatus when an empty tray is transferred from the working station to the shunting station.
Figure 4:
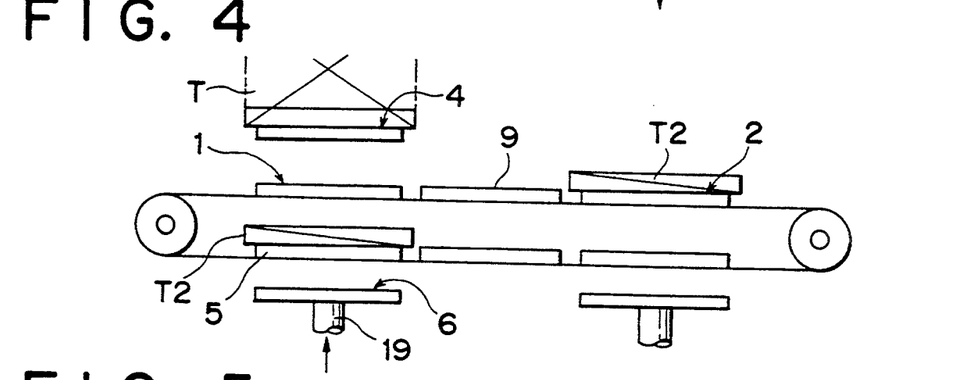
FIG. 4 is a schematic side view showing the apparatus when a loaded tray and an empty tray are conveyed to the working station and the switching station, respectively.
Figure 5:
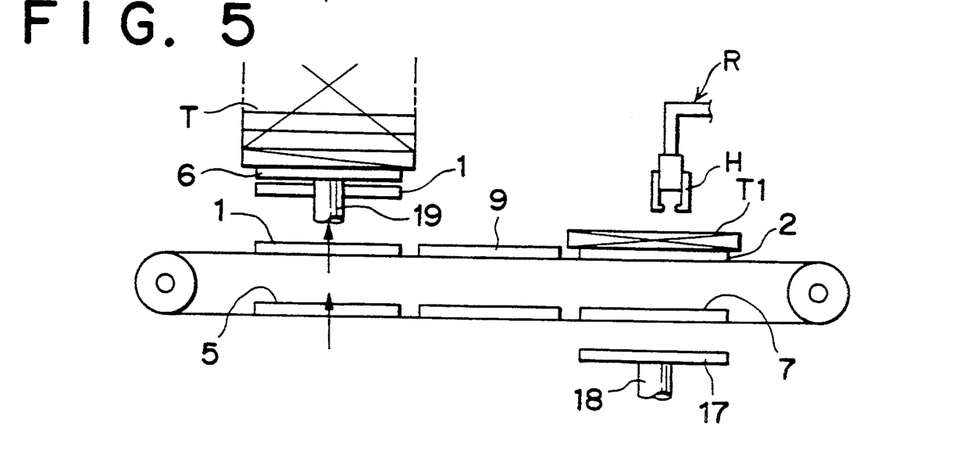
FIG. 5 is a schematic side view showing the apparatus in the initial stage when a loaded tray is separated from a stack of loaded trays.
Figure 6:
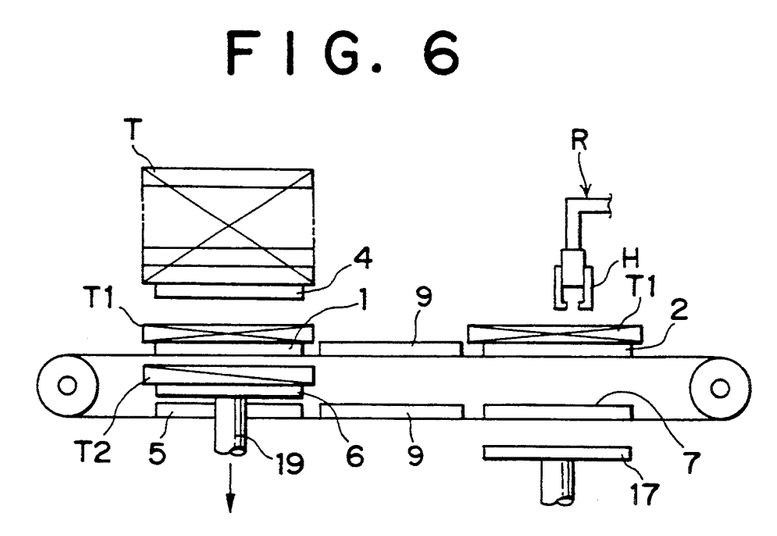
FIG. 6 is a schematic side view showing the manner in which the separated loaded tray is supported in the waiting station.
Figure 7:
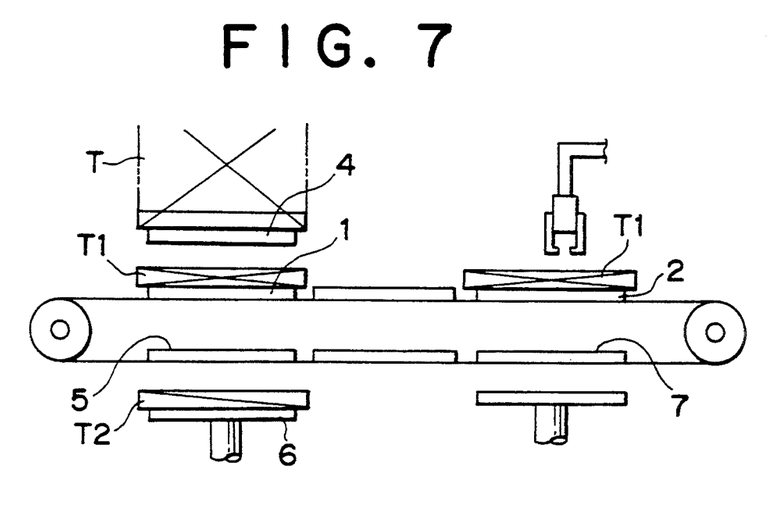
FIG. 7 is a schematic side view showing the apparatus when an empty tray is conveyed to the collecting station.

As mentioned above, when the loaded tray T1 supplied to the working station 2 has been emptied, the empty tray T2 is lowered to the shunting station 7 (FIG. 3) and is then returned to the switching station 5 (FIG. 4), whereupon the empty tray T2 is raised (FIG. 5) and the stack of loaded trays T are supported on the empty tray T2. Then the empty tray T2 is lowered, and on its downward way, the stack of loaded trays T except the lowermost loaded tray are supported in the stocking station 4. The loaded tray T1 placed on the empty tray T2 is supported in the waiting station 1 (FIG. 6), and the empty tray T2 is supported and held on the collecting station 6 (FIG. 7). By repeating the foregoing steps, successive empty trays are held in stack on the collecting station 6.

As the successive empty trays T2 are placed in a stack on the collecting station 6, the stack increases in height; but the upward and downward stroke of the collecting station 6 has to be kept constant. Consequently the level at which the uppermost empty tray T2 of the stack on the plate of the collecting station 6 is to be stopped is detected by a sensor (not shown).

As the foregoing steps are repeated, the amount of loaded trays a stocked in a stack on the stocking station 4 will be reduced gradually, and on the other hand, the number of emptied trays in the collecting station 6 is increased one by one. Consequently, a control unit (not shown) stops the operation of the apparatus when the loaded tray T1 in the stocking station 4 are used up, or when the number of empty trays in the collecting station 6 reaches a predetermined value. If continuous supply of parts is necessary, the amount of stack in the stocking and collecting stations 4, 6 will be managed occasionally; according to need, loaded trays T will be added, while empty trays T2 will be discharged.

Figure 2:
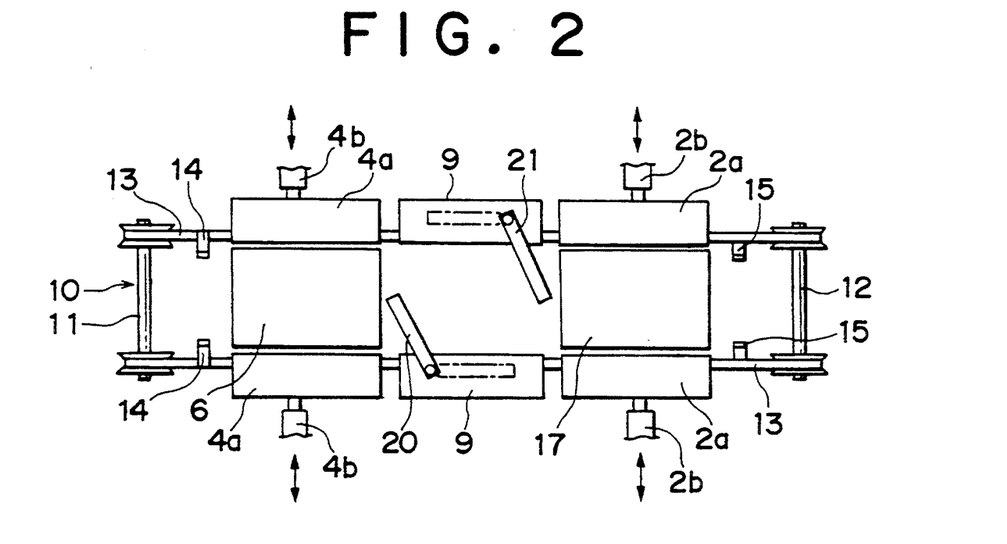
FIG. 2 is a plan view of FIG. 1.

As shown in FIG. 2, two levers 20, 21 are pivotally mounted on the respective fixed guides 9 for positioning the trays T1 precisely in the waiting and working stations 1, 2.

According to this invention, the tray conveying method comprises the steps of: conveying a loaded tray, which accommodates a plurality of parts in rows, from the waiting station to the working station along the supply path; simultaneously with the conveying, returning an empty tray, which is supported in the shunting station, to the switching station along the discharge path; raising the empty tray, which has been returned to the switching station, up to the stocking station, supporting a large number of loaded trays in stack on the raised empty tray in the stocking station, and then lowering the empty tray down to the collecting station; during the lowering step, supporting the stack of loaded trays except the lowermost loaded tray again in the stocking station; supporting the loaded tray, which is left on the empty tray, in the waiting station; and lowering the emptied tray in the working station to the shunting station, during the last-named supporting step. This method causes the following results.

Since, when the loaded tray in the working station is emptied the empty tray will be lowered and instantly the next loaded tray will be supplied, it is possible to pick up the individual parts so as to load them to an automatic assembling machine continuously.

Since the method includes returning the empty tray downwardly of the stocking station, vertically moving the empty tray there, separating a loaded tray from the stack of loaded trays and collecting the empty tray, it is possible to facilitate automation of these steps. Further, since the space of each of the stocking, waiting and switching stations has only such a width that the trays can be supported in the individual station, it is possible to perform the separating step quickly.

According to the tray conveying apparatus of this invention, a supply path and a discharge path are situated on the upper and lower sides, respectively, of the apparatus. The stocking, waiting, switching and collecting stations are arranged one under the other in order on the base-end side of the supply path. The waiting station is situated on the supply path, while the switching station is situated on the discharge path. The working station is situated on the front-end side of the supply path, and the shunting station is situated under the working station on the discharge path. Each of the stocking, waiting, switching, working and shunting stations is so constructed as to support and release the tray. The collecting station is vertically movable by the separating lifter, and the receiving plate under the shunting station is vertically movable by the transferring lifter. This arrangement causes the following results.

Partly since the transferring of the loaded tray and the returning of the empty tray take place simultaneously, and partly since the empty tray is returned downwardly of the stocking station, it is possible to provide the working station on the front end of the supply path so that the working station can be situated near an automatic assembling machine or the like.

While the collecting station is vertically moved by the separating lifter, the stocking, waiting and switching stations are opened and closed successively to support and release the tray so that the lowermost loaded tray can be separated from the stack of loaded trays and can be supported in the waiting station and so that the empty tray can be held in the collecting station. Partly since these movements are simple motions including a rectilinear reciprocating motion and a right vertical motion, and partly since the trays are kept to have horizontal postures and kept from being inclined during the separating, it is possible to hold parts in the tray surely in row without being disordered. Further it is possible to make the structure of the apparatus simple and small-sized.

Since the receiving plate is vertically moved by the transferring lifter when removing the emptied tray from the working station, it is possible to remove the empty tray without being inclined, so that the stack of loaded trays can be supported surely on the empty tray and a large number of empty trays can be placed in stack on the collecting station orderly.

What is claimed is:

1. A method of conveying trays comprising the steps of:

providing a supply path, and a discharge path below the supply path;

providing a waiting station having a waiting station support surface for receiving a tray loaded with parts, said waiting station located at one end of the supply path;

providing a working station having a working station support surface for receiving the tray located at a respective opposite end of the supply path from the waiting station;

providing a switching station having a switching station support surface for receiving an unloaded tray located in the discharge path below the waiting station;

providing a shunting station having a shunting station support surface for receiving an unloaded tray located in the discharge path below the working station;

providing a stocking station having a stocking station support surface for receiving a plurality of trays loaded with parts located above the waiting station;

providing a collecting station below the switching station having a collecting station support surface for receiving a plurality of unloaded trays; and the operating steps of:

(a) conveying a loaded tray from the waiting station support surface to the working station support surface along the supply path, unloading the parts from the loaded tray at the working station to produce an empty tray;

(b) simultaneously with said conveying, returning an empty tray, which is supported on the shunting station support surface, to the switching station support surface along the discharge path;

(c) raising the empty tray, which has been returned to the switching station support surface, up to the stocking station, supporting a large number of loaded trays in a stack on the raised empty tray in the stocking station, and then lowering the empty tray down to the collecting station;

(d) supporting, during said lowering step, the stack of loaded trays except the lowermost loaded tray again by the stocking station support surface in the stocking station;

(e) supporting the lowermost loaded tray, which is left on the empty tray, on the waiting station support surface; and (f) lowering the empty tray on the working station support surface to the shunting station support surface during the last-named supporting step.

2. An apparatus for conveying trays, comprising:

(a) a stocking station with a stocking station support surface on which a plurality of loaded trays each accommodating a plurality of parts are supported in a stack to be released individually;

(b) a waiting station with a waiting station support surface for holding a loaded tray and which is situated under said stocking station and in which the loaded tray separated from the stack of loaded trays is to be supported and released;

(c) a switching station with a switching station support surface which is situated under said waiting station and in which an empty tray is to be supported and released;

(d) a collecting station with a collecting station support surface which is situated under said switching station and in which a plurality of the empty trays are to be placed in a stack, said collecting station support surface having a separating lifter and being adapted to be raised to and lowered from said stocking station via said switching station and said waiting station by said separating lifter;

(e) a working station having a working station support surface which is situated at a forward end of a supply path extending from said waiting station and in which the loaded tray is to be supported, unloaded and released;

(f) a shunting station having a shunting station support surface for holding an unloaded tray and which is situated under said working station and in which the empty tray is to be supported and released;

(g) a receiving plate having a receiving plate support surface and a transferring lifter and which is situated under said shunting station for supporting the tray and said receiving plate support surface adapted to be raised to and lowered from said working station by said transferring lifter; and (h) a discharge path situated between said shunting station and said switching station.

3. An apparatus for conveying trays loaded with parts to a parts unloader in a manufacturing process, comprising:

a stocking station having a stocking station support means for holding a vertical stack of loaded trays loaded with parts at an elevation;

a waiting station having a waiting station support means for supporting a loaded tray below said stocking station;

a working station having a working station support means for supporting a loaded tray, said working station located horizontally at a distance from said waiting station;

a supply path having a translation means for moving a loaded tray from said waiting station to said working station;

a shunting station having a shunting station support surface located below said working station and having a means of receiving an empty tray from said working station and positioning said empty tray on said shunting station support surface;

a switching station having a switching station support means for supporting an empty tray below said waiting station;

a discharge path having a translation means for moving said tray from said shunting station support surface to said switching station support means; and a means for lifting said empty tray from said switching station support means upwardly to said stocking station to support a bottommost loaded tray on said empty tray and lowering said bottommost loaded tray to be supported on said waiting station support means.

4. The apparatus according to claim 3, wherein said means for lifting is arranged below said switching station and comprises a lifting surface which accumulates empty trays from said switching station.

5. The apparatus according to claim 4, wherein said means for receiving an empty tray from said working station comprises a lifter operable to support said empty tray at said working station and thereafter lower said empty tray to said shunting station support surface.

6. The apparatus according to claim 5, wherein said translation means of said supply path and said translation means of said discharge path comprise upper and lower surfaces of a driven conveyor belt respectively.

7. The apparatus according to claim 6, wherein said conveyor belt comprises two spaced apart endless belts, spaced apart a sufficient distance to allow trays to pass therethrough vertically.

8. The apparatus according to claim 7, wherein said stocking station support means, said waiting station support means, and said working station support means each comprise horizontally opposed support members hydraulically actuated to close together and spread apart to support and release trays respectively.

9. The apparatus according to claim 3, wherein said means for receiving an empty tray from said working station comprises a lifter operable to support said empty tray at said working station and thereafter lower said empty tray to said shunting station support surface.

10. The apparatus according to claim 3, wherein said translation means of said supply path and said translation means of said discharge path comprise upper and lower surfaces of a driven conveyor belt respectively.

11. The apparatus according to claim 10, wherein said conveyor belt comprises two spaced apart endless belts, spaced apart a sufficient distance to allow trays to pass therethrough vertically.

12. The apparatus according to claim 3, wherein said stocking station support means, said waiting station support means, and said working station support means each comprise horizontally opposed support members hydraulically actuated to close together and spread apart to support and release trays respectively.

* * * * *